(12) United States Patent
Tuduki et al.

(10) Patent No.: US 10,319,986 B2
(45) Date of Patent: Jun. 11, 2019

(54) POSITIVE ELECTRODE FOR NONAQUEOUS ELECTROLYTE SECONDARY BATTERIES AND NONAQUEOUS ELECTROLYTE SECONDARY BATTERY

(71) Applicant: Sanyo Electric Co., Ltd., Daito-shi, Osaka (JP)

(72) Inventors: Kouhei Tuduki, Hyogo (JP); Atsushi Fukui, Hyogo (JP)

(73) Assignee: SANYO Electric Co., Ltd., Daito-shi (JP)

( * ) Notice: Subject to any disclaimer, the term of this patent is extended or adjusted under 35 U.S.C. 154(b) by 70 days.

(21) Appl. No.: 15/525,353

(22) PCT Filed: Nov. 18, 2015

(86) PCT No.: PCT/JP2015/005760
§ 371 (c)(1),
(2) Date: May 9, 2017

(87) PCT Pub. No.: WO2016/084346
PCT Pub. Date: Jun. 2, 2016

(65) Prior Publication Data
US 2017/0324080 A1   Nov. 9, 2017

(30) Foreign Application Priority Data
Nov. 28, 2014   (JP) ................... 2014-242408

(51) Int. Cl.
*H01M 4/02* (2006.01)
*H01M 4/04* (2006.01)
(Continued)

(52) U.S. Cl.
CPC .......... *H01M 4/131* (2013.01); *H01M 4/366* (2013.01); *H01M 4/505* (2013.01); *H01M 4/525* (2013.01);
(Continued)

(58) Field of Classification Search
CPC ...... H01M 4/131; H01M 4/366; H01M 4/505; H01M 4/525; H01M 4/628; H01M 4/0404;
(Continued)

(56) References Cited

U.S. PATENT DOCUMENTS

| | | | |
|---|---|---|---|
| 2007/0160906 A1* | 7/2007 | Tooyama | H01M 4/362 429/223 |
| 2010/0209771 A1 | 8/2010 | Shizuka et al. | |

(Continued)

FOREIGN PATENT DOCUMENTS

| | | |
|---|---|---|
| JP | 2005-255433 A | 9/2005 |
| JP | 2006-344509 A | 12/2006 |

(Continued)

OTHER PUBLICATIONS

International Search Report dated Feb. 9, 2016, issued in counterpart of International Application No. PCT/JP2015/005760 (2 pages).

*Primary Examiner* — Gregg Cantelmo
(74) *Attorney, Agent, or Firm* — Westerman, Hattori, Daniels & Adrian, LLP

(57) ABSTRACT

A positive electrode for nonaqueous electrolyte secondary batteries includes a positive electrode current collector and a positive electrode mix layer, formed on the current collector, containing a positive electrode active material. The positive electrode active material mainly contains a lithium transition metal oxide in which the molar ratio of nickel (Ni) to a transition metal component is 20% or more. The positive electrode mix layer contains a plurality of pores and has a first peak of a logarithmic differential pore volume distribution (dV/dlogD) that appears in the range where the pore diameter D is less than 1 μm and a second peak of the logarithmic differential pore volume distribution (dV/dlogD) that appears in the range where the pore diameter D is 1 μm or more in a pore distribution determined by mercury (Continued)

intrusion porosimetry. According to this configuration, a nonaqueous electrolyte secondary battery having excellent output characteristics can be provided.

17 Claims, 4 Drawing Sheets

(51) Int. Cl.
    *H01M 4/36*     (2006.01)
    *H01M 4/62*     (2006.01)
    *H01M 4/131*     (2010.01)
    *H01M 4/505*     (2010.01)
    *H01M 4/525*     (2010.01)
    *H01M 10/052*     (2010.01)
    *H01M 4/1391*     (2010.01)

(52) U.S. Cl.
    CPC .......... *H01M 4/628* (2013.01); *H01M 4/0404* (2013.01); *H01M 4/1391* (2013.01); *H01M 10/052* (2013.01); *H01M 2004/021* (2013.01); *H01M 2004/028* (2013.01)

(58) Field of Classification Search
    CPC ............. H01M 4/1391; H01M 10/052; H01M 2004/021; H01M 2004/028
    See application file for complete search history.

(56) References Cited

U.S. PATENT DOCUMENTS

2012/0270093 A1* 10/2012 Isozaki ................. H01M 4/131
    429/156
2012/0288759 A1* 11/2012 Nagai ..................... H01M 4/13
    429/211
2013/0011726 A1     1/2013 Takano et al.

FOREIGN PATENT DOCUMENTS

| | | |
|---|---|---|
| JP | 2007-184145 A | 7/2007 |
| JP | 2009-289726 A | 12/2009 |
| JP | 2011-108554 A | 6/2011 |
| JP | 2012-23015 A | 2/2012 |
| JP | 2012-209161 A | 10/2012 |
| JP | 2013-33746 A | 2/2013 |
| JP | 5168763 B2 | 3/2013 |
| JP | 2014-86384 A | 5/2014 |

* cited by examiner

POSITIVE ELECTRODE FOR NONAQUEOUS ELECTROLYTE SECONDARY BATTERIES AND NONAQUEOUS ELECTROLYTE SECONDARY BATTERY

TECHNICAL FIELD

The present disclosure relates to a positive electrode for nonaqueous electrolyte secondary batteries and a nonaqueous electrolyte secondary battery.

BACKGROUND ART

Nonaqueous electrolyte secondary batteries are required to have further enhanced output characteristics mainly for applications for motor power supplies for electric vehicles (EVs), hybrid electric vehicles (HEVs), electric tools, and the like. In view of such circumstances, for example, Patent Literature 1 proposes an electrode including an active material layer in which low- and high-density regions with a constant thickness are periodically present. Patent Literature 2 proposes an electrode including an active material layer including a thin portion with a small thickness.

CITATION LIST

Patent Literature

PTL 1: Japanese Patent No. 5168763
PTL 2: Japanese Published Unexamined Patent Application No. 2013-33746

SUMMARY OF INVENTION

Technical Problem

However, the electrodes disclosed in Patent Literatures 1 and 2 cannot sufficiently improve output characteristics of nonaqueous electrolyte secondary batteries.

Solution to Problem

A positive electrode for nonaqueous electrolyte secondary batteries according to an aspect of the present disclosure includes a positive electrode current collector and a positive electrode mix layer, formed on the current collector, containing a positive electrode active material. The positive electrode active material mainly contains a lithium transition metal oxide in which the molar ratio of nickel (Ni) to a transition metal component is 20% or more. The positive electrode mix layer contains a plurality of pores and has a first peak of a logarithmic differential pore volume distribution (dV/dlogD) that appears in the range where the pore diameter D is less than 1 μm and a second peak of the logarithmic differential pore volume distribution (dV/dlogD) that appears in the range where the pore diameter D is 1 μm or sore in a pore distribution determined by mercury intrusion porosimetry.

Advantageous Effects of Invention

In accordance with a positive electrode for nonaqueous electrolyte secondary batteries according to an aspect of the present disclosure, output characteristics of a battery including the positive electrode can be enhanced.

BRIEF DESCRIPTION OF DRAWINGS

FIG. 5 shows results obtained by measuring the thickness of positive electrode mix layers along the line X-Y of. FIG. 2.

DESCRIPTION OF EMBODIMENTS

Figure 1:
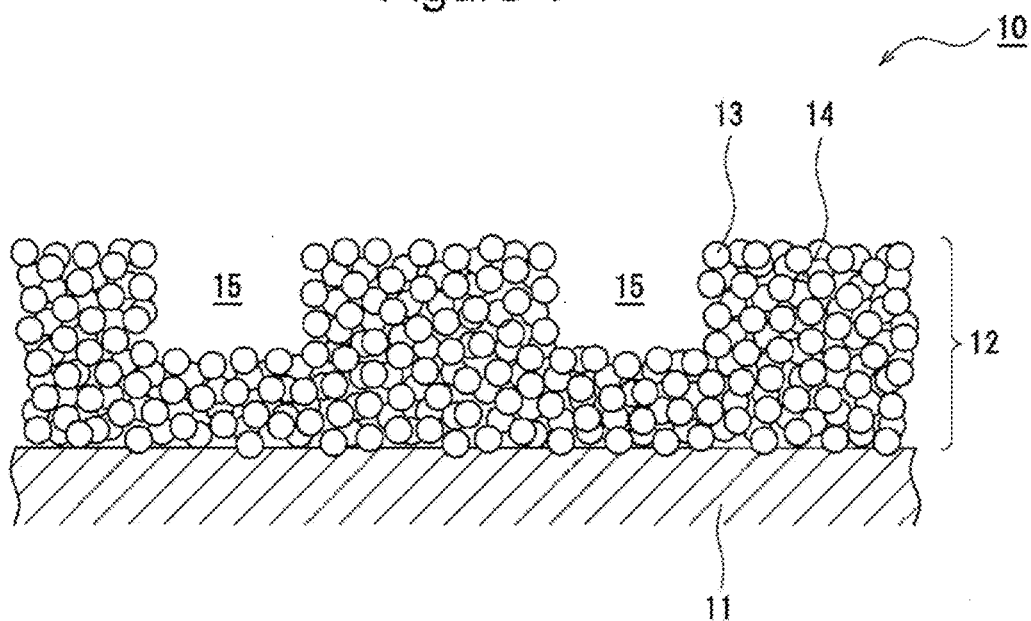
FIG. 1 is a schematic view showing a cross section of a positive electrode that is an example of an embodiment.

Enhancing the ionic conductivity and electronic conductivity of positive electrode mix layers is important in enhancing output characteristics of nonaqueous electrolyte secondary batteries by improving positive electrodes. In a conventional general positive electrode, the electronic conductivity of a positive electrode mix layer is enhanced in such a manner that the number of contacts between positive electrode active materials is increased by increasing the density of the positive electrode mix layer and a large amount of material which has a small particle size and which is excellent in electrical conductivity is mixed in the positive electrode mix layer. However, in such a configuration, the migration of ions in the positive electrode mix layer is inhibited, the ionic conductivity is low, and therefore it is difficult to sufficiently enhance output characteristics. Therefore, Patent Literatures 1 and 2 propose the above-mentioned electrode structure for the purpose of enhancing the ionic conductivity of the positive electrode mix layer. Output characteristics have been incapable of being sufficiently improved even though an electrode having the structure. The inventors have found that the electrode structure is disrupted by the change in volume of a positive electrode active material due to charge or discharge and this is a major reason why output characteristics of batteries are not improved even though the electrodes disclosed in Patent Literatures 1 and 2 are used. In order to improve output characteristics of nonaqueous electrolyte secondary batteries, the inventors have performed intensive investigations. As a result, the inventors have appreciated a positive electrode for nonaqueous electrolyte secondary batteries according to the present disclosure.

In a positive electrode for nonaqueous electrolyte secondary batteries according to an aspect of the present disclosure (hereinafter simply referred to as the positive electrode), a positive electrode mix layer has a first peak of a logarithmic differential pore volume distribution (dV/dlogD) that appears in the range where the pore diameter D is less than 1 μm and a second peak of the logarithmic differential pore volume distribution (dV/dlogD) that appears in the range where the pore diameter D is 1 μm or more in a pore distribution determined by mercury intrusion porosimetry. That is, the positive electrode mix layer contains pores (cavities) having a diameter of 1 μm or more corresponding to the second peak. The presence of such large pores allows ions to readily migrate in the positive electrode mix layer, thereby increasing the ionic conductivity of the positive electrode mix layer. A positive electrode active material mainly contains a lithium transition metal oxide in which the molar ratio of nickel (Ni) to a transition metal component is 20% or more. This enables the change in volume of the positive electrode active material due to charge or discharge to be reduced; hence, the pore distribution of the positive electrode mix layer is maintained so as to exhibit the first peak and the second peak after charge or discharge. Since the change in volume thereof is small, the change in distribution of a liquid in an electrode structure can be reduced and there is an effect that stable ion supply in an electrode can be maintained. Thus, in accordance with a positive electrode for nonaqueous electrolyte secondary batteries according to an aspect of the present disclosure, output characteristics of a battery including the positive electrode can be enhanced.

An example of an embodiment is described below in detail.

A nonaqueous electrolyte secondary battery that is an example of an embodiment includes a positive electrode, a negative electrode, and a nonaqueous electrolyte. A separator is preferably placed between the positive electrode and the negative electrode. The nonaqueous electrolyte secondary battery has, for example, a structure in which a wound electrode assembly prepared by winding the positive electrode and the negative electrode with the separator therebetween and the nonaqueous electrolyte are housed in a battery case. Alternatively, a stacked electrode assembly prepared by alternately stacking positive electrodes and negative electrodes with separators therebetween or another type of electrode assembly may be used instead of the wound electrode assembly. The following cases can be exemplified as the battery case, in which the electrode assembly and the nonaqueous electrolyte are housed: cylindrical, rectangular, coin-shaped, and button-shaped metal cases; cases (laminated batteries) formed from a laminated sheet prepared by laminating metal foil with a resin sheet; and the like.

[Positive Electrode]

FIG. 1 is a schematic view showing a cross section of a positive electrode 10 that is an example of an embodiment. As exemplified in FIG. 1, the positive electrode 10 includes a positive, electrode current collector 11 and positive electrode mix layers 12 formed on the current collector. The positive electrode current collector 11 used may be foil of a metal, such as aluminium, stable within the potential range of the positive electrode 10; a film including a surface layer containing the metal; or the like. The positive electrode mix layers 12 contain a positive electrode active material 13 and preferably further contain a tungsten oxide, a phosphate compound, a conductive material, and a binding material (not shown). The positive electrode 10 can be prepared in such a manner that, for example, positive electrode mix slurry containing the positive electrode active material 13, the conductive material, the binding material, and the like is applied to the positive electrode current collector 11; wet coatings are dried; the dry coatings are pressed with rollers; and the positive electrode mix layers 12 are thereby formed on both surfaces of the current collector.

The positive electrode mix layers 12 have a plurality of pores 14 and 15. The pores 14 are cavities which are present between particles of the positive electrode active material 13 that are in contact with each other and which are smaller than the diameter of particles of the active material. The diameter of the pores 14 can be adjusted depending on, for example, the particle diameter of the positive electrode active material 13, the degree of compression of the positive electrode mix layers 12, the amount of the added conductive material, or the like. The pores 15 are cavities larger than the pores 14 and have a role in enhancing the ionic conductivity of the positive electrode mix layers 12. Incidentally, the electronic conductivity of the positive electrode mix layers 12 is ensued by, for example, portions in which the positive electrode active material 13 is in contact with each other with the conductive material therebetween. The pores 14 are pores corresponding to a first peak in a pore distribution determined by mercury intrusion porosimetry and the pores 15 pores corresponding to a second peak therein as described below. That is, the positive electrode mix layers 12 have two types of pores indicated by the first peak and the second peak.

The pores 15 are preferably formed over a wide region, for example, substantially the whole of the positive electrode mix layers 12. The pores 14 are formed in substantially the whole of the positive electrode mix layers 12. At least one of the pores 15 is preferably open to a surface of the positive electrode mix layers 12. That is, the pores 15 have openings in surfaces of the positive electrode mix layers 12 that face a negative electrode with a separator therebetween. More ions are present in surfaces of the positive electrode mix layers 12 than in inner portions of the layers. Therefore, the migration of ions to the inner portions of the layers can be promoted because the pores 15 have the openings in the surfaces of the positive electrode mix layers 12, thereby significantly contributing to the enhancement of output characteristics. As shown in FIG. 1, in each positive electrode mix layer 12, the pores 15 extend from a surface of the positive electrode mix layer 12 and are concave in cross section. For example, all of the pores 15 extend from surfaces of the positive electrode mix layers 12, are concave in cross section, and are opening to the surfaces of the positive electrode mix layers 12.

Figure 2:
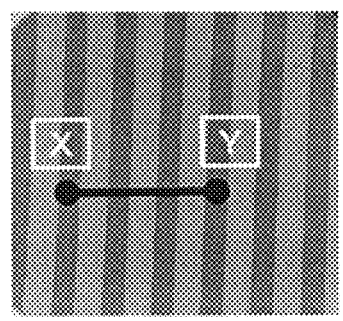
FIG. 2 is an illustration showing a micrograph of a surface of a positive electrode that is an example (Example 1) of an embodiment.

FIG. 2 is an illustration showing a micrograph of a surface of a positive electrode (a laser microscope image of a surface of a positive electrode mix layer) that is an example (Example 1 below) of an embodiment. The pores 15 are formed in, for example, a surface of each positive electrode mix layer 12 in the form of grooves (refer to FIGS. 1 and 2). A plurality of grooves may be formed in the surface of the positive electrode mix layer 12 in different directions so as to have different sizes and are preferably regularly formed. The grooves are formed at substantially equal intervals so as to have, for example, substantially the same width and so as to extend in substantially the same direction.

Figure 3:
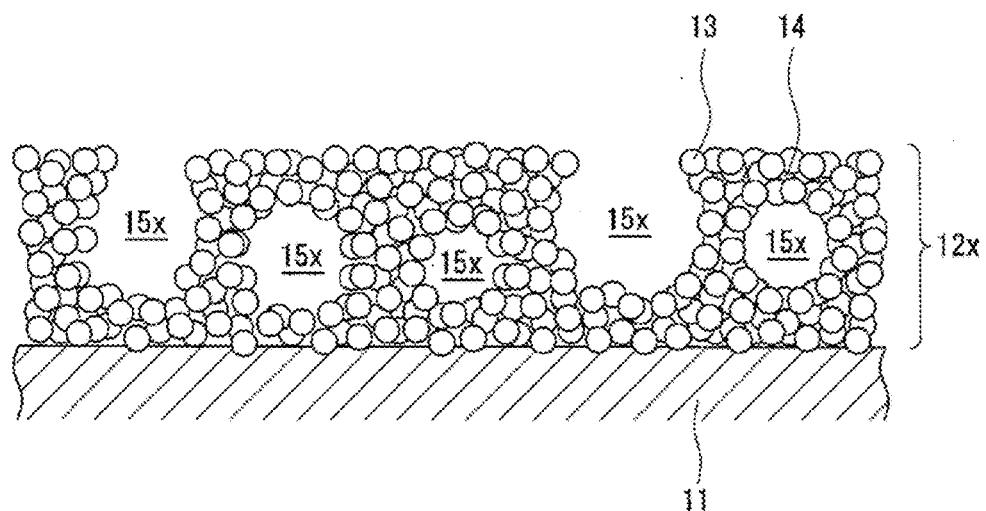
FIG. 3 is a schematic view showing a cross section of a positive electrode which is another example of an embodiment.

A plurality of pores 15x are irregularly arranged in a positive electrode mix layer 12x exemplified in FIG. 3. In an example shown in FIG. 3, some of the pores 15x are open to a surface of the positive electrode mix layer 12x. The other pores 15x are not open to the surface of the positive electrode mix layer 12x and are surrounded by the positive electrode active material 13. The shape of the pores is not particularly limited and the pores may have a spherical shape, a cylindrical shape, or an irregular shape.

The pores 15 exemplified in FIG. 1 can be formed in such a manner that the positive electrode mix layers 12 are rolled using, for example, a member (a die or the like) having an irregular surface in contact with each positive electrode mix layer 12. Portions pressed by convex portions of the die are the pores 15 open to a surface of the positive electrode mix layer 12. Using a die having narrowly formed convex portions periodically arranged in the same direction enables a plurality of periodically arranged grooves (the pores 15) to be formed in a surface of the positive electrode mix layer 12 (refer to FIG. 2). The pores 15 can be regularly formed in such a manner that a pattern is printed on the positive electrode current collector by a screen printing process, an inkjet printing process, or the like using the positive electrode mix slurry. Alternatively, the pores 15 may be formed in such a manner that a material soluble in a solvent or the like, a material capable of being removed by heat treatment, or the like is used as a template for the pores 15 and the template is removed. In the case where templates are regularly formed by lithography or the like, the pores 15 can be regularly formed in the positive electrode mix layers 12. On the other hand, in the case where, for example, a material for forming a template is mixed with the positive electrode mix slurry, the pores 15x are irregularly formed as shown in FIG. 3.

The capacity per unit area of each positive electrode mix layer in an in-plane direction varies depending on sites. The maximum capacity per unit area of the positive electrode needs to be less than the capacity per unit area of the negative electrode, which faces the positive electrode.

Figure 4:
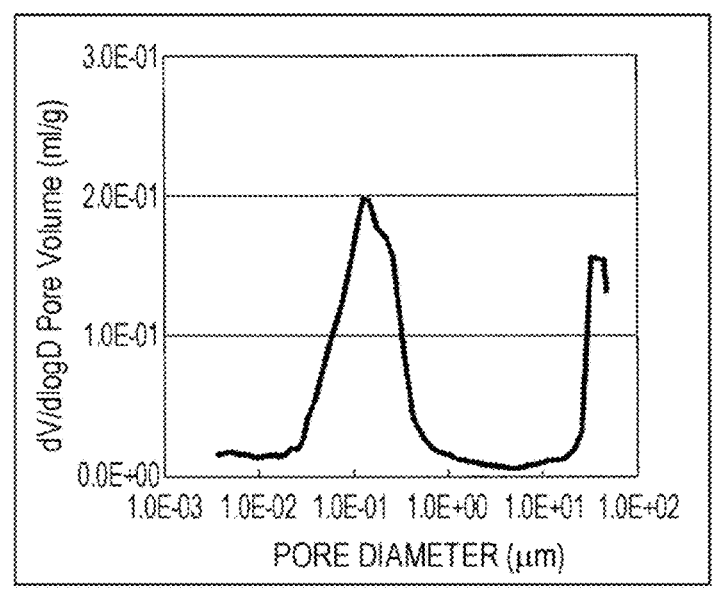
FIG. 4 shows results obtained by measuring the pore distribution of a positive electrode that is an example (Example 1) of an embodiment by mercury intrusion porosimetry.

FIG. 4 shows results obtained by measuring the pore distribution of a positive electrode that is an example (Example 1 below) of an embodiment by mercury intrusion porosimetry. As shown in FIG. 4, a positive electrode mix layer has a first peak of a logarithmic differential pore volume distribution (dV/dlogD) that appears in the range where the pore diameter D is less than 1 μm in the pore distribution determined by mercury intrusion porosimetry. The positive electrode mix layer further has a second peak of the logarithmic differential pore volume distribution (dV/dlogD) that appears in the range where the pore diameter D is 1 μm or more. That is, the positive electrode mix layer has a pore distribution in which the first peak and the second peak appear. The first peak shows the presence of the pores 14 exemplified in FIGS. 1 and 3. The second peak shows the presence of the pores 15 and 15x.

A pore distribution using the logarithmic differential pore volume distribution (dV/dlogD) is one that is obtained in such a manner that a value (dV/dlogD) is determined by dividing the differential pore volume dV that is the differential of the pore volume V by the logarithmic differential dlogD of the pore diameter D and this value is plotted against the pore diameter D. The pore distribution of the positive electrode mix layer is measured in such a manner that a measurement sample (the weight of the sample is a value excluding the mass of a current collector) obtained by cutting the positive electrode to a predetermined size (for example, 5 mm×5 mm) and is measured with, for example, a mercury intrusion porosimeter using a predetermined amount.

The ratio (D2/D1) of a second mode diameter D2 corresponding to the second peak to a first mode diameter D1 corresponding to the first peak is preferably five times or more, more preferably five times to 1,000 times, and particularly preferably 50 times to 500 times. When D2/D1 is within this range, for example, the electronic conductivity of the positive electrode mix layer is maintained good and the ionic conductivity thereof is readily enhanced. The mode diameter D1 is maximum dV/dlogD in the range where the pore diameter D is less than 1 μm that is, the pore diameter indicating the peak top of the first peak. The mode diameter D2 is maximum dV/dlogD in the range where the pore diameter D is 1 μm or more, that is, the pore diameter indicating the peak top of the second peak.

The first mode diameter D1 is, for example, less than 0.8 μm preferably 0.05 μm to 0.8 μm, and more preferably 0.1 μm to 0.5 μm. The second mode diameter D2 is, for example, 1 μm to 100 μm, preferably 1 μm to 50 μm and more preferably 5 μm to 30 μm. The intensity ratio (the intensity of the second peak/the intensity of the first peak) of the second peak to the first peak is not particularly limited and is preferably 0.2 times to 2.0 times.

The positive electrode active material mainly contains a lithium transition metal oxide (hereinafter referred to as the lithium transition metal oxide Z) in which the molar ratio of nickel (Ni) to a transition metal component is 20% or more. Containing 20 mole percent or more of Ni reduces the change in volume of the active material due to charge or discharge, thereby enabling the above-mentioned pore distribution to be maintained. Herein, the term "mainly containing the lithium transition metal oxide Z" means that the lithium transition metal oxide Z is most contained among materials making up the positive electrode active material. The lithium transition metal oxide Z is preferably 50 weight percent or more of the total mass of the positive electrode active material and more preferably 80 weight percent or more. In this embodiment, the lithium transition metal oxide Z only is used as the positive electrode active material.

The lithium transition metal oxide Z preferably contains 20 mole percent or more of Ni with respect to the transition metal component, more preferably 20 mole percent to 55 mole percent, and particularly preferably 20 mole percent to 48 mole percent. When the content of Ni is within this range, for example, the capacity of a battery is maintained high and output characteristics can be readily enhanced by reducing the change in volume of the lithium transition metal oxide Z due to charge or discharge.

The lithium transition metal oxide Z preferably contains cobalt (Co) and manganese (Mn) in addition to Ni and may contain an element other than these elements. A preferable example of the lithium transition metal oxide Z is a lithium nickel-cobalt-manganate in which the content of Ni is 20 mole percent or more with respect to the transition metal component. The following elements can be exemplified as elements other than Ni, Co, and Mn: transition metal elements such as zirconium (Zr) and tungsten (W), alkali metal elements, alkaline-earth metal elements, and group 12 to 14 elements. Zr has, for example, a function for stabilizing the crystal structure of the lithium transition metal oxide Z. W has, for example, a function for suppressing side reactions on the surface of the positive electrode active material.

The maximum rate of change in cell volume of the lithium transition metal oxide Z at a charge cut-off potential between zero charge and 4.3 V (vs. Li/Li+) is preferably 1.5% or less and more preferably 1.0% or less. The rate of change in cell volume of the lithium, transition metal oxide Z is calculated from the cell volume Vc0 at zero charge and the cell volume Vc1 after charge to a predetermined charge potential at which the cell volume is maximum by the formula [(Vc1−Vc0)/Vc0]×100. The cell volumes Vc0 and Vc1 are determined by measuring the positive electrode mix layer by X-ray diffraction.

The lithium transition metal oxide Z preferably contains tungsten (W). Containing W enables side reactions on the surface of the active material to be suppressed. The content of W is preferably 0.05 mole percent to 10 mole percent with respect to metal elements, excluding Li, in the lithium transition metal oxide Z; more preferably 0.1 mole percent to 5 mole percent; and particularly preferably 0.2 mole percent to 3 mole percent.

W can be contained in the oxide in such a manner that in the synthesis of the lithium transition metal oxide Z, for example, a composite oxide containing Ni, Co, Mn, and the like; a lithium compound such as lithium hydroxide; and W or a tungsten compound such as a tungsten oxide are mixed together and are fired. W is preferably present in the lithium transition metal oxide Z in the form of a solid solution. A solid solution of W can be formed in the lithium transition metal oxide in such a manner that in the synthesis of the lithium transition metal oxide Z, a composite oxide containing Ni, Co, Mn, and the like and W are mixed together and are fired. W may be deposited at the interfaces between primary particles or on the surfaces of secondary particles in the form of an oxide or metal.

The lithium transition metal oxide Z is in the form of, for example, secondary particles (not separated into primary particles by ultrasonic dispersion or the like) composed of aggregates of primary particles. The particle diameter of the lithium transition metal oxide Z is not particularly limited and the volume-average particle diameter thereof is preferably 0.1 µm to 20 µm as determined by a laser diffraction method. When the particle diameter of the lithium transition metal oxide Z is within this range, both the good ionic conductivity and electronic conductivity of the positive electrode mix layer are readily achieved. From the viewpoint of the retentivity and diffusivity of an electrolyte solution, the lithium transition metal oxide Z preferably has a large specific surface area as determined by the BET method. It is preferable that the particle diameter of the active material is small and the BET of the active material is large, because the change in volume of each particle during charge or discharge is small and the change of an electrode structure is readily suppressed.

The positive electrode mix layer preferably contains at least one of a phosphate compound and a tungsten oxide. The phosphate compound and the tungsten oxide have a function for suppressing side reactions due to charge or discharge. The content of each of the phosphate compound and the tungsten oxide is preferably 0.01 weight percent to 5 weight percent with respect to the total weight of the positive electrode active material, more preferably 0.05 weight percent to 4 weight percent, and particularly preferably 0.1 weight percent to 3 weight percent. The particle diameter of each of the phosphate compound and the tungsten oxide is preferably less than the particle diameter of the positive electrode active material and is, for example, 25% or less of the average particle diameter of the positive electrode active material.

The phosphate compound, which is mixed in the positive electrode mix layer, is at least one selected from the group consisting of, for example, lithium phosphate, lithium dihydrogen phosphate, cobalt phosphate, nickel phosphate, manganese phosphate, potassium phosphate, and ammonium dihydrogen phosphate. Among these compounds, lithium phosphate is particularly preferably used. The tungsten oxide, which is mixed in the positive electrode mix layer, is not particularly limited and is preferably $WO_3$, in which the oxidation number of tungsten is hexavalent and tungsten is most stable.

The phosphate compound and the tungsten oxide can be attached to the surfaces of particles of the active material by mechanically mixing the phosphate compound and the tungsten oxide with the positive electrode active material. Alternatively, in a step of preparing the positive electrode mix slurry by kneading the conductive material and the binding material, the phosphate compound and the tungsten oxide may be mixed in the positive electrode mix layer by adding the phosphate compound and the tungsten oxide. The phosphate compound and the tungsten are preferably added to the positive electrode mix layer by the former method. This allows the phosphate compound and the tungsten oxide to be efficiently present near the surfaces of particles of the active material. Side reactions with an electrolyte solution during charge or discharge can be suppressed by forming the W solid solution, adding the phosphate compound and the tungsten oxide, and the like. The occurrence of the side reactions with the electrolyte solution causes organic matter to be deposited on the surface of the active material, thereby causing a change in volume. Therefore, the presence of a substance, such as W, suppressing side reactions enables the change of an electrode structure and the change in distribution of a liquid to be suppressed, thereby enabling the increase in unnecessary reaction resistance of a surface to be suppressed. Therefore, the heterogeneity of reactions in the mix layer and the heterogeneity of volume changes in the mix layer due to an increase in polarization can be reduced, the electrode structure and the distribution of the liquid can be maintained, and output characteristics are readily enhanced.

The conductive material is used to increase the electrical conductivity of the positive electrode mix layer. Examples of the conductive material include carbon materials such as carbon black, acetylene black, Ketjenblack, and graphite. These can be used alone or in combination. In the conductive material, for example, 1 weight percent to 15 weight percent of carbon black is used with respect to the total mass of the positive electrode mix layer. Carbon black usually used as a conductive material has a smaller particle diameter as compared to the active material. Therefore, the presence of a large amount of the carbon black in the positive electrode mix layer increases the number of contacts between particles thereof to strengthen the electrode structure. From this viewpoint, at large amount of the carbon black is preferably present therein.

The binding material is used to maintain the good contact between the positive electrode active material and the conductive material and to increase the adhesion of the positive electrode active material to a surface of the positive electrode current collector. Examples of the binding material include fluorinated resins such as polytetrafluoroethylene (PTFE) and polyvinylidene fluoride (PVdF), polyacrylonitrile (PAN), polyimide resins, acrylic resins, and polyolefin resins. These resins may be used in combination with carboxymethylcellulose (CMC), a salt thereof (that may be CMC-Na, CMC-K, CMC-$NH_4$, or a partially neutralized salt), polyethylene oxide (PEO), or the like. These may be used alone or in combination.

[Negative Electrode]

The negative electrode includes, for example, a negative electrode current collector made of metal foil or the like and negative electrode mix layers formed on the current collector. The negative electrode current collector used may be foil of a metal, such as copper, stable in the potential range of the negative electrode or a film including a surface layer made of the metal. The negative electrode mix layers preferably contain a negative electrode active material and a binding material. The negative electrode can be prepared in such a manner that, for example, negative electrode mix slurry containing the negative electrode active material, the binding material, and the like is applied to the negative electrode current collector; wet coatings are dried; the dry coatings are pressed; and the negative electrode mix layers are thereby formed on both surfaces of the current collector.

The negative electrode active material is not particularly limited and may be one capable of reversibly storing and releasing lithium ions. The following materials can be used: for example, a carbon material such as natural graphite or synthetic graphite; a metal, silicon (Si) or tin (Sn), alloying with lithium; an alloy containing these metal elements; a composite oxide; or the like. The negative electrode active material may be used alone or a mixture of multiple types of negative electrode active materials may be used.

As is the case with the positive electrode, the binding material used may be a fluorinated resin, PAN, a polyimide resin, an acrylic resin, a polyolefin resin, or the like. In the case of using an aqueous solvent to prepare the negative electrode mix slurry, the following material is preferably used: styrene-butadiene rubber (SBR), CMC, a salt thereof, polyacrylic acid (PAA), a salt thereof (that may be PAA-Na, PAA-K, or a partially neutralized salt), polyvinyl alcohol (PVA), or the like.

[Separator]

The separator used is a porous sheet having ionic permeability and electrical insulation properties. Examples of the porous sheet include microporous thin films, fabrics, and nonwoven fabrics. The separator is preferably made of an olefin resin such as polyethylene or polypropylene or cellulose. The separator may be a laminate including a cellulose fiber layer and a thermoplastic resin fiber layer made of the olefin resin or the like.

[Nonaqueous Electrolyte]

The electrolyte is, for example, a nonaqueous electrolyte containing a nonaqueous solvent and an electrolyte salt dissolved in the nonaqueous solvent. The nonaqueous electrolyte is not limited to a liquid electrolyte (nonaqueous electrolyte) and may be a solid electrolyte containing a gelled polymer or the like. The following solvents can be used for the nonaqueous solvent: for example, esters, ethers, nitriles, amides such as dimethylformamide, and mixtures of two or more of these solvents. A sulfo group-containing compound such as propanesultone may be used. The nonaqueous solvent may contain a halogen-substituted compound obtained by substituting hydrogen in at least one of these solvents with an atom of a halogen such as fluorine.

Linear carboxylates can be exemplified as the esters. The linear carboxylates are not particularly limited and are preferably linear carboxylates containing three to five carbon atoms. Examples thereof include methyl propionate, ethyl propionate, methyl acetate, ethyl acetate, and propyl acetate. Among these carboxylates, methyl propionate is particularly preferably used. The content of a linear carboxylate is preferably 3 volume percent to 30 volume percent with respect to the total volume of the nonaqueous solvent, which makes up the nonaqueous electrolyte. When the content of the linear carboxylate is within this range, good coatings are likely to be formed on the surfaces of the active materials and good storage durability can be obtained.

Examples of the esters (other than the linear carboxylates) include cyclic carbonates such as ethylene carbonate (EC), propylene carbonate (PC), butylene carbonate, and vinylene carbonate; linear carbonates such as dimethyl carbonate (DMC), ethyl methyl carbonate (EMC), diethyl carbonate (DEC), methyl propyl carbonate, ethyl propyl carbonate, and methyl isopropyl carbonate; and cyclic carboxylates such as γ-butyrolactone (GBL) and γ-valerolactone (GVL).

Examples of the ethers include cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineol, and crown ethers and linear ethers such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl.

Examples of the nitriles include acetonitrile, propionitrile, butyronitrile, valeronitrile, n-heptanenitrile, succinonitrile, glutaronitrile, adiponitrile, pimelonitrile, 1,2,3-propanetricarbonitrile, and 1,3,5-pentanetricarbonitrile.

The following carboxylate is preferably used as the halogen-substituted compound: a fluorinated cyclic carbonate such as fluoroethylene carbonate (FEC), a fluorinated linear carbonate, a fluorinated linear carboxylate such as methyl fluoropropionate (FMP), or the like.

A solvent mixture of the cyclic carbonate and the linear carbonate is preferably used as the nonaqueous solvent in addition to the linear carboxylate. The volume ratio between the cyclic carbonate and linear carbonate used in combination is preferably 2:8 to 5:5.

The electrolyte salt is preferably a lithium salt. Examples of the lithium salt include $LiBF_4$; $LiClO_4$; $LiPF_6$; $LiAsF_6$; $LiSbF_6$; $LiAlCl_4$; $LiSCN$; $LiCF_3SO_3$; $LiC(C_2F_5SO_2)$; $LiCF_3CO_2$; $Li(P(C_2O_4)F_4)$; $Li(P(C_2O_4)F_2)$; $LiPF_{6-x}(C_nF_{2n+1})_x$ (where $1 < x < 6$ and n is 1 or 2); $LiB_{10}Cl_{10}$; LiCl; LiBr; LiI; chloroborane lithium; lithium lower aliphatic carboxylates; borates such as $Li_2B_4O_7$, $Li(B(C_2O_4)_2)$ [lithium bis(oxalate) borate (LiBOB)], and $Li(B(C_2O_4)F_2$; and imide salts such as $LiN(FSO_2)_2$ and $LiN(C_lF_{2l+1}SO_2)(C_mF_{2m+1}SO_2)$ {where l and m are integers greater than or equal to 1}. The lithium salt may be used alone or a mixture of multiple types of these salts may be used. Among these salts, at least one fluorine-containing lithium salt is preferably used from the viewpoint of ionic conductivity and electrochemical stability. For example, $LiPF_6$ is preferably used. In particular, from the viewpoint that a coating stable in a high-temperature environment is formed on a surface of the negative electrode, the fluorine-containing lithium salt and a lithium salt containing oxalato complex anions (for example, LiBOB) are preferably used in combination. The concentration of the lithium salt is preferably 0.8 mol to 1.8 mol per liter of the nonaqueous solvent. In particular, in order to obtain high output power, the concentration thereof is more preferably 1.2 mol to 1.5 mol. The nonaqueous electrolyte preferably has low viscosity. In the case of having a mix layer having a good path for ion conduction, using a nonaqueous solvent with low viscosity may possibly further promote the diffusion of ions.

EXAMPLES

The present disclosure is further described below in detail with reference to examples. The present disclosure is not limited to the example.

«First Embodiment»

Example 1

[Preparation of Positive Electrode Active Material]

A nickel-cobalt-manganese composite hydroxide was obtained in such a manner that $NiSO_4$, $CoSO_4$, and $MnSO_4$ were mixed in an aqueous solution and were co-precipitated. The nickel-cobalt-manganese composite hydroxide was fired, whereby a nickel-cobalt-manganese composite oxide was prepared. Next, the composite oxide, lithium hydroxide, and a tungsten oxide ($WO_3$) were mixed in an Ishikawa-type Raikai mortar such that the molar ratio of lithium to nickel-cobalt-manganese, which is a transition metal whole, to tungsten was 1.2:1:0.005. The mixture was fired in air, followed by crushing, whereby a lithium transition metal oxide (positive electrode active material) represented by $Li_{1.07}Ni_{0.35}Co_{0.35}Mn_{0.30}O_2$ was obtained.

[Preparation of Positive Electrode]

The positive electrode active material, carbon black, and polyvinylidene fluoride (PVDF) were mixed at a weight ratio of 91:7:2. N-methyl-2-pyrrolidone (NMP) serving as a dispersion medium was added to the mixture, followed by kneading, whereby positive electrode mix slurry was prepared. Next, the positive electrode mix slurry was applied to aluminium foil that was a positive electrode current collector, followed by drying wet coatings, whereby positive electrode mix layers were formed on both surfaces of the aluminium foil.

The following dies were prepared: dies in which convex portions having a width of 60 µm and a height of 40 µm (grooves having a width of 60 µm and a height of 40 µm were arranged on a surface of a nickel plate with a thickness of 200 µm at intervals of 80 µm from one end of the nickel plate to the other. The dies were provided on the positive electrode mix layers (provided on both sides of a positive electrode) and the positive electrode mix layers were rolled with rolling rollers through the dies, whereby a plurality of grooves (groove-shaped pores) were formed in surfaces of the positive electrode mix layers. In this way, a positive electrode including the positive electrode mix layers containing two types of pores was obtained.

Figure 5:
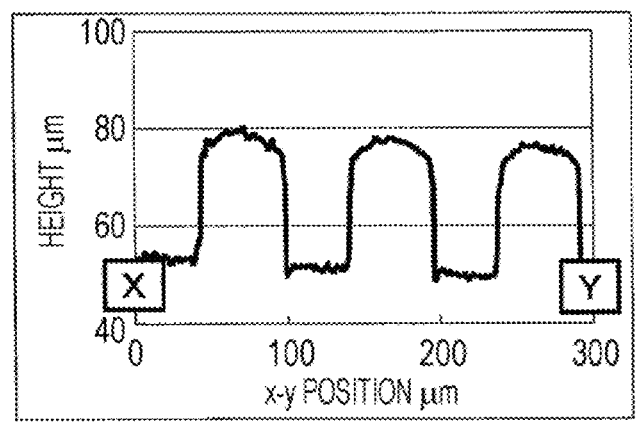

FIG. 2 is an illustration showing a laser microscope image of a surface of the positive electrode mix layers. FIG. 5 shows results obtained by measuring the thickness of the positive electrode mix layers along the line X-Y of FIG. 2. Surfaces of the positive electrode mix layers have grooves, periodically arranged, having a width of 40 µm and a depth of 23 µm (both are average values). FIG. 4 shows results obtained by measuring the pore distribution of the positive electrode mix layers by mercury intrusion porosimetry. As is clear from FIG. 4, in the pore distribution of the positive electrode mix layers measured by mercury intrusion porosimetry, a first peak appears in the range where the pore diameter D is less than 1 µm and a second peak appears in the range where the pore diameter B is 1 µm or more.

[Preparation of Nonaqueous Electrolyte Solution]

Ethylene carbonate (EC), ethyl methyl carbonate (EMC), dimethyl carbonate (DMC), and methyl propionate (MP) were mixed at a volume ratio of 3:3:4. $LiPF_6$ was dissolved in the solvent mixture such that the concentration thereof was 1.2 mol/L, whereby a nonaqueous electrolyte solution was prepared.

[Preparation of Test Cell]

Figure 6:
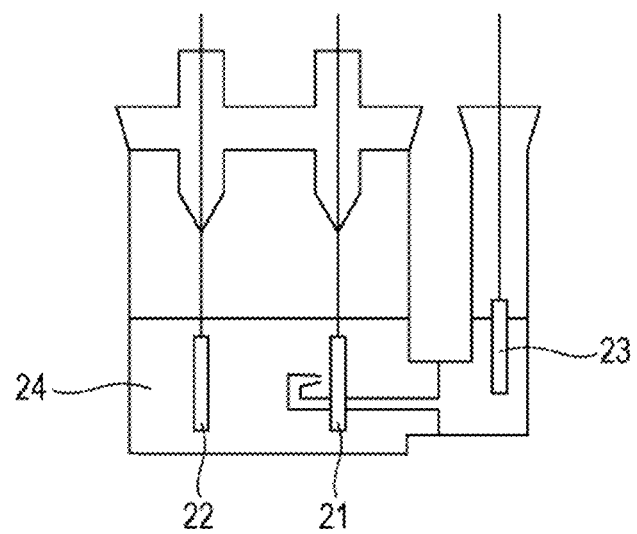
FIG. 6 is a schematic view of a test cell prepared in each of examples and comparative examples.

A three-electrode test cell A1 shown in FIG. 6 was prepared using the positive electrode having an aluminium lead attached thereto as a working electrode 21. Metallic lithium was used to prepare a counter electrode 22 serving as a negative electrode and a reference electrode 23. A nonaqueous electrolyte 24 used was the above-mentioned nonaqueous electrolyte solution.

Comparative Example 1

Figure 7:
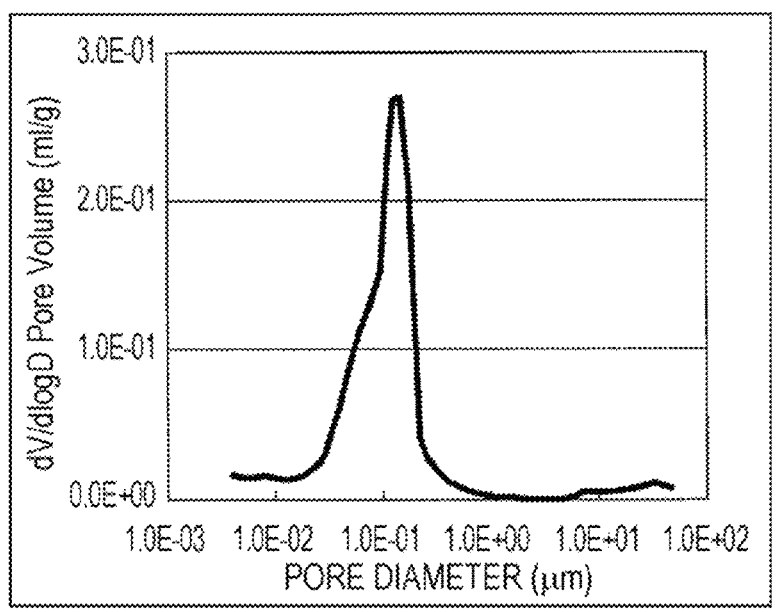
FIG. 7 shows results obtained by measuring the pore distribution of a positive electrode of Comparative Example 1 by mercury intrusion porosimetry.

A test cell B1 was prepared in substantially the same manner as that used in Example 1 except that the above-mentioned dies were not used when positive electrode mix layers were rolled using rolling rollers. FIG. 7 shows results obtained by measuring the pore distribution of a positive electrode, prepared in Comparative Example 1, by mercury intrusion porosimetry. As is clear from FIG. 7, in the pore distribution of the positive electrode, prepared in Comparative Example 1, measured by mercury intrusion porosimetry, a first peak appears in the range where the pore diameter D is less than 1 µm and no peak is observed in the range where the pore diameter D is 1 µm or more.

Example 2

A test cell A2 was prepared in substantially the same manner as that used in Example 1 except that no compound containing W was mixed when a mixture (having a composition/blending ratio corresponding to $Li_{1.07}Ni_{0.35}Mn_{0.30}O_2$) of a nickel-cobalt-manganese composite oxide and lithium hydroxide as a positive electrode active material was fired.

Comparative Example 2

A test cell B2 was prepared in substantially the same manner as that used in Example 2 except that the above-mentioned dies were not used when positive electrode mix layers were rolled using rolling rollers.

Comparative Example3

A test cell Ay was prepared in substantially the same manner as that used in Example 2 except that a lithium transition metal oxide represented by $Li_{1.02}Co_{1.00}O_2$ was used as a positive electrode active material.

Comparative Example 4

A test cell By was prepared in substantially the same manner as that used in Comparative Example 3 except that the above-mentioned dies were not used when positive electrode mix layers were rolled using rolling rollers.

Comparative Example 5

A test cell Ax was prepared in substantially the same manner as that used in Example 2 except that a lithium transition metal oxide represented by $Li_{1.05}Ni_{0.05}Co_{0.90}Mn_{0.05}O_2$ was used as a positive electrode active material.

Comparative Example 6

A test cell Bx was prepared in substantially the same manner as that used in Comparative Example 5 except that the above-mentioned dies were not used when positive electrode mix layers were rolled using rolling rollers.

Example 3

A test cell A3 was prepared in substantially the same manner as that used in Example 2 except that a lithium transition metal oxide represented by $Li_{1.06}Ni_{0.20}Co_{0.60}Mn_{0.20}O_2$ was used as a positive electrode active material.

Comparative Example 7

A test cell B3 was prepared in substantially the same manner as that used in Example 3 except that the above-mentioned dies were not used when positive electrode mix layers were rolled using rolling rollers.

Example 4

A test cell A4 was prepared in substantially the same manner as that used in Example 1 except that a lithium transition metal oxide (positive electrode active material) containing W was prepared in such a manner that a mixture (having a composition/blending ratio corresponding to $Li_{1.07}Ni_{0.465}Co_{0.275}Mn_{0.26}O_2$) of a nickel-cobalt-manganese composite oxide and lithium hydroxide was mixed with a tungsten oxide ($WO_3$) such that the molar ratio of lithium to nickel-cobalt-manganese, which is a transition metal whole, to tungsten was 1.2:1:0.005, followed by firing.

Comparative Example 8

A test cell B4 was prepared in substantially the same manner as that used in Example 4 except that the above-mentioned dies were not used when positive electrode mix layers were rolled using rolling rollers.

For the test cell prepared in each of Examples 1 to 4 and Comparative Examples 1 to 8, the following items were evaluated by methods below: the mode diameter in the pore distribution of the positive electrode mix layers measured by mercury intrusion porosimetry, the rate of change in cell volume of the positive electrode active material after charge and discharge, and output characteristics. The measurement results were shown in Tables 1 and 2.

[Evaluation of Mode Diameter]

A measurement sample was prepared by cutting the positive electrode of each test cell to a size of 5 mm×5 mm, followed by measuring the pore distribution of the positive electrode mix layers by mercury intrusion porosimetry. An instrument used was a mercury intrusion porosimeter. The weight of a sample was a value excluding the weight of the current collector. The pore distribution was obtained by plotting the pore diameter D on the horizontal axis and the logarithmic differential pore volume distribution (dV/dlogD) on the vertical axis (refer to FIGS. 4 and 7). On the basis of the results, whether a first peak appearing in the range where the pore diameter D is less than 1 µm and a second peak appearing in the range where the pore diameter D is 1 µm or more were present was checked. The first mode diameter D1 or second mode diameter D2 corresponding to the peak top (the maximum of dV/dlogD) of each observed peak was determined.

[Evaluation of Rate of Change in Cell Volume]

After constant-current charge was performed up to 4.3 V (vs. Li/Li+) at a current density of 0.2 l·t (C rate) under 25° C. temperature conditions, the positive electrode was taken out of each test cell and the positive electrode mix layers were measured by X-ray diffraction, whereby the cell volume (Vc2) of the positive electrode active material after charge was determined.

Since the maximum cell volume Vc1 is equal to or greater than the; cell volume (Vc2) after charge is performed up to 4.3 V (vs. Li/Li+), the rate of change in cell volume of the positive electrode active material was calculated from the cell volume Vc0 before charge and the cell volume Vc2 after charge by the formula [(Vc2−Vc0)/Vc0]×100 and was substituted.

[Evaluation of Output Characteristics]

Under 25° C. temperature conditions, constant-current charge was performed up to 4.3 V (vs. Li/Li+) at a current density of 0.2 l·t (C rate) and constant-voltage charge was performed at a constant voltage of 4.3 V (vs. Li/Li+) until the current density reached 0.05 l·t (C rate). The discharge capacity determined by performing constant-current discharge up to 2.5 V (vs. Li/Li+) at a current density of 0.2 l·t (C rate) under 25° C. temperature conditions was defined as the rated capacity of each test cell.

Next, the voltage when charge was performed up to half the rated capacity at a current density of 0.2 l·t and a rest was taken for 10 minutes was defined as the start voltage. Subsequently, discharge was performed at a current density of 10 l·t for 10 seconds and the voltage was measured after 10 seconds. The voltage at this moment was defined as the cut-off voltage.

The current corresponding to 2.5 V was calculated using the value obtained by dividing the voltage change between the cut-off voltage and the start voltage by 10 l·t as a slope. The value obtained by multiplying the current by 2.5 V and dividing the current by the coating weight and area of the positive electrode active material was defined as the output. The rate of increase in output was calculated by the following equation:

Rate of increase in output=output of test cell A/output of test cell B.

TABLE 1

| | Positive electrode active material | | | Pore diameter distribution | | | Output characteristics | |
|---|---|---|---|---|---|---|---|---|
| | | | Rate of change in cell volume (%) | First mode diameter D1 (µm) | Second mode diameter D2 (µm) | D2/D1 | Output W/(cm² · g) | Rate of increase in output |
| Cell | Ni/Co/Mn | Additive | | | | | | |
| A1 | 35/35/30 | 0.5 mole percent of W | −0.6 | 0.13 | 25 | 197 | 2.37 | 1.08 |
| B1 | " | 0.5 mole percent of W | " | 0.15 | Not observed | — | 2.20 | — |
| Ay | 0/100/0 | — | 2.3 | 0.24 | 29 | 121 | 1.09 | 1.01 |
| By | " | — | " | 0.14 | Not observed | — | 1.08 | — |

TABLE 2

| Cell | Positive electrode active material Ni/Co/Mn | Additive | Rate of change in cell volume (%) | Pore diameter distribution First mode diameter D1 (μm) | Second mode diameter D2 (μm) | D2/D1 | Rate of increase in output |
|------|---------------------------------------------|----------|------------------------------------|--------------------------------------------------------|------------------------------|-------|----------------------------|
| A1 | 35/35/30 | 0.5 mole percent of W | −0.6 | 0.13 | 25 | 197 | 1.08 |
| A2 | 35/35/30 | — | −0.5 | 0.13 | 19 | 146 | 1.06 |
| A3 | 20/60/20 | — | 0.5 | 0.18 | 32 | 200 | 1.04 |
| Ax | 5/90/5 | — | 1.8 | 0.33 | 29 | 88 | 1.00 |
| Ay | 0/100/0 | — | 2.3 | 0.24 | 29 | 121 | 1.01 |
| A4 | 46.5/27.5/26 | 0.5 mole percent of W | 1.3 | 0.18 | 32 | 183 | 1.06 |

As is clear from Table 1, the test cell of each of the examples has more excellent output characteristics as compared to the test cell of a corresponding one of the comparative examples. The positive electrode mix layers of the examples have two types of pores indicated by the above-mentioned first and second peaks. However, for the positive electrode mix layers of the comparative examples, the first peak only was observed.

As is clear from Table 2, the test cells Ay and Ax of Comparative Examples 3 and 5, in which the molar ratio of Ni to the transition metal component in the lithium transition metal oxide is less than 20%, have no enhanced output characteristics as compared to the case of lacking two types of pores (the test cells By and Bx of Comparative Examples 4 and 6). That is, in the test cells Ay and Ax, the rate of change in cell volume of the positive electrode active material due to charge is high and therefore it is conceivable that the structure (pore distribution) of the positive electrode mix layers for increasing the ionic conductivity and the distribution of the electrolyte solution varied and output characteristics were not enhanced. In other words, only in the case where positive electrode mix layers have two types of pores indicated by the first peak and the second peak and the molar ratio of Ni to a transition metal component is 20% or more, output characteristics can be enhanced. Using the positive electrodes prepared in the examples enables the change in volume of the positive electrode active material to foe reduced and also enables output characteristics of the test cells to be enhanced because the pore distribution of the positive electrode mix layers that exhibits the first peak and the second peak is maintained and the change in distribution of a liquid in an electrode structure can be reduced.

Adding $WO_3$ during the firing of a lithium transition metal oxide (Examples 1 and 4) suppresses, for example, side reactions during charge or discharge, thereby enabling output characteristics to be further enhanced.

«Second Embodiment»

Example 5

A test cell A5 was prepared in substantially the same manner as that used in Example 4 except that positive electrode mix layers were formed using a mixture prepared by mixing the lithium transition metal oxide (positive electrode active material) containing W with 0.5 weight percent of a tungsten oxide ($WO_3$) with respect to an active material.

Comparative Example 9

A test cell B5 was prepared in substantially the same manner as that used in Example 5 except that the above-mentioned dies were not used when positive electrode mix layers were rolled using rolling rollers.

Example 6

A test cell A6 was prepared in substantially the same manner as that used in Example 4 except that positive electrode mix layers were formed using a mixture prepared by mixing the lithium transition metal oxide (positive electrode active material) containing W with 0.5 weight percent of a tungsten oxide ($WO_3$) with respect to an active material and 1.0 weight percent of lithium phosphate ($Li_3PO_4$) with respect to the active material.

Comparative Example 10

A test cell B6 was prepared in substantially the same manner as that used in Example 6 except that the above-mentioned dies were not used when positive electrode mix layers were rolled using rolling rollers.

For the test cell prepared in each of Examples 4 to 6 and Comparative Examples 8 to 10, the following items were evaluated: the mode diameter in the pore distribution of the positive electrode mix layers measured by mercury intrusion porosimetry, the rate of change in cell volume of the positive electrode active material after charge and discharge, and output characteristics determined by a method below. The measurement results were shown in Table 3.

[Evaluation of Output Characteristics]

Under 25° C. temperature conditions, constant-current charge was performed up to 4.3 V (vs. Li/Li+) at a current density of 0.2 1·t (C rate) and constant-voltage charge was performed at a constant voltage of 4.3 V (vs. Li/Li+) until the current density reached 0.05 1·t (C rate). The discharge capacity determined by performing constant-current discharge up to 2.5 V (vs. Li/Li+) at a current density of 0.2 1·t (C rate) under 25° C. temperature conditions was defined as the rated capacity of each test cell.

Next, the voltage when charge was performed up to half the rated capacity at a current density of 0.2 1·t and a rest was taken for 10 minutes was defined as the start voltage. Subsequently, discharge was performed at a current density of 30 1·t for 10 seconds and the voltage was measured after 10 seconds. The voltage at this moment was defined as the cut-off voltage.

The current corresponding to 2.5 V was calculated using the value obtained by dividing the voltage change between the cut-off voltage and the start voltage by 30 1·t as a slope. The value obtained by multiplying the current by 2.5 V and dividing the current by the coating weight and area of the positive electrode active material was defined as the output.

The rate of increase in output was calculated, by the following equation:

Rate of increase in output=output of test cell A/output of test cell B.

TABLE 3

| | Positive electrode active material | | | Pore diameter distribution | | | |
|---|---|---|---|---|---|---|---|
| Cell | Ni/Co/Mn | Additive | Rate of change in cell volume (%) | First mode diameter D1 (μm) | Second mode diameter D2 (μm) | D2/D1 | Rate of increase in output |
| A4 | 46.5/27.5/26 | 0.5 mole percent of W | 13 | 0.18 | 32 | 183 | 1.02 |
| A5 | " | 0.5 mole percent of W 0.5 weight percent of $WO_3$ | " | 0.14 | 19 | 134 | 1.04 |
| A6 | " | 0.5 mole percent of W 0.5 weight percent of $WO_3$ 1.0 weight percent of $Li_3PO_4$ | " | 0.16 | 23 | 148 | 1.05 |

As is clear from Table 3, adding $WO_3$ or $Li_3PO_4$ to the positive electrode active material (Example 5 or 6) suppresses, for example, side reactions during charge or discharge, thereby enabling output characteristics to be further enhanced. Furthermore, $WO_3$ and $Li_3PO_4$ have a role in enhancing the retentivity of an electrolyte solution and a good ion conduction path is present in an electrode; hence, it is conceivable that $WO_3$ and $Li_3PO_4$ facilitate the diffusion of ions during discharge at a particularly high current density to contribute to the enhancement of battery performance.

REFERENCE SIGNS LIST

10 Positive electrode
11 Positive electrode current collector
12, 12x Positive electrode mix layers
13 Positive electrode active material
14, 15, 15x Pores

The invention claimed is:

1. A positive electrode for nonaqueous electrolyte secondary batteries, comprising a positive electrode current collector and a positive electrode mix layer, formed on the current collector, containing a positive electrode active material,
   wherein the positive electrode active material mainly contains a lithium transition metal oxide in which the molar ratio of nickel (Ni) to a transition metal component is 20% or more and
   the positive electrode mix layer contains a plurality of pores and has a first peak of a logarithmic differential pore volume distribution (dV/dlogD) that appears in the range where the pore diameter D is less than 1 μm and a second peak of the logarithmic differential pore volume distribution (dV/dlogD) that appears in the range where the pore diameter D is 5 μm or more in a pore distribution determined by mercury intrusion porosimetry,
   wherein the plurality of pores corresponding to the second peak are regularly formed on a surface of the positive electrode mix layer.

2. The positive electrode for nonaqueous electrolyte secondary batteries according to claim 1, wherein the ratio (D2/D1) of a second mode diameter D2 corresponding to the second peak to a first mode diameter D1 corresponding to the first peak is fifty times or more.

3. The positive electrode for nonaqueous electrolyte secondary batteries according to claim 1, wherein, in the lithium transition metal oxide, the molar ratio of nickel (Ni) to the transition metal component is 35% or more.

4. The positive electrode for nonaqueous electrolyte secondary batteries according to claim 1, wherein the maximum rate of change in cell volume of the lithium transition metal oxide at a charge cut-off potential between zero charge and 4.3 V (vs. Li/Li+) is 1.5% or less.

5. The positive electrode for nonaqueous electrolyte secondary batteries according to claim 1, wherein the lithium transition metal oxide contains tungsten (W).

6. The positive electrode for nonaqueous electrolyte secondary batteries according to claim 1, wherein the positive electrode mix layer contains at least one of a phosphate compound and a tungsten oxide.

7. A nonaqueous electrolyte secondary battery comprising:
   the positive electrode according claim 1;
   a negative electrode; and
   a nonaqueous electrolyte.

8. The positive electrode for nonaqueous electrolyte secondary batteries according to claims 1, wherein the second peak of the logarithmic differential pore volume distribution (dV/dlogD) appears in the range where the pore diameter D is 19 μm or more.

9. The positive electrode for nonaqueous electrolyte secondary batteries according to claims 1, wherein the pores corresponding to the second peak are grooves.

10. The positive electrode for nonaqueous electrolyte secondary batteries according to claims 9, wherein the grooves are formed at a substantially same interval.

11. A positive electrode for nonaqueous electrolyte secondary batteries comprising a positive electrode current collector and a positive electrode mix layer formed on the positive electrode current collector,
   wherein the positive electrode mix layer includes:
   a plurality of positive electrode active material particles formed on the positive electrode current collector,
   a plurality of cavities, which are present between a certain particle of the positive electrode active material particles and other particles of the positive electrode active material particles contacting the certain particle, and which have a first peak of a logarithmic differential pore volume distribution (dV/dlogD) that appears in the range where a diameter D of each of the plurality of cavities is less than 1 μm and, a plurality of pores, which have openings in a surface of the positive electrode mix layer, and which have a second peak of the logarithmic differential pore volume distribution (dV/dlogD) that appears in the range where the diameter D of each of the plurality of pores is 5 µm or more, wherein the plurality of positive electrode active material particles mainly contains a lithium transition metal oxide in which the molar ratio of nickel (Ni) to a transition metal component is 20% or more.

12. The positive electrode for nonaqueous electrolyte secondary batteries according to claims 11, wherein the diameter D of each of the plurality of cavities is smaller than a diameter of each of the plurality of positive electrode active material particles.

13. A positive electrode for nonaqueous electrolyte secondary batteries comprising a positive electrode current collector and a positive electrode mix layer formed on the positive electrode current collector, wherein the positive electrode mix layer includes:

a plurality of positive electrode active material particles formed on the positive electrode current collector, a plurality of cavities, which are present between a certain particle of the positive electrode active material particles and other particles of the positive electrode active material particles contacting the certain particle, and which have a first peak of a logarithmic differential pore volume distribution (dV/dlogD) that appears in the range where a diameter D is less than 1 µm and, a plurality of grooves formed in the positive electrode mix layer, and which have a second peak of the logarithmic differential pore volume distribution (dV/dlogD) that appears in the range where the diameter D is 5 µm or more, wherein the plurality of positive electrode active material particles mainly contains a lithium transition metal oxide in which the molar ratio of nickel (Ni) to a transition metal component is 20% or more.

14. The positive electrode for nonaqueous electrolyte secondary batteries according to claims 13, the diameter D of each of the plurality of cavities is smaller than a particle diameter of each of the plurality of positive electrode active material particle.

15. The positive electrode for nonaqueous electrolyte secondary batteries according to claims 13, wherein each of the plurality of grooves have substantially a same width.

16. The positive electrode for nonaqueous electrolyte secondary batteries according to claims 13, wherein each of the plurality of grooves extend in substantially the same direction.

17. The positive electrode for nonaqueous electrolyte secondary batteries according to claims 13, wherein the plurality of grooves are formed at substantially equal intervals.

* * * * *